(12) United States Patent
Chen

(10) Patent No.: US 12,084,070 B2
(45) Date of Patent: Sep. 10, 2024

(54) AUTONOMOUS OR SEMI-AUTONOMOUS VEHICLE ELECTRONIC ARCHITECTURE

(71) Applicant: Pony AI Inc., Grand Cayman (KY)

(72) Inventor: Kai Chen, San Jose, CA (US)

(73) Assignee: Pony AI Inc., Grand Cayman (KY)

( * ) Notice: Subject to any disclaimer, the term of this patent is extended or adjusted under 35 U.S.C. 154(b) by 349 days.

(21) Appl. No.: 17/346,782

(22) Filed: Jun. 14, 2021

(65) Prior Publication Data

US 2022/0396279 A1 Dec. 15, 2022

(51) Int. Cl.
*B60W 50/04* (2006.01)
*G05B 13/02* (2006.01)
*G07C 5/08* (2006.01)
*B60W 50/00* (2006.01)

(52) U.S. Cl.
CPC ......... *B60W 50/045* (2013.01); *G05B 13/027* (2013.01); *G07C 5/0808* (2013.01); *B60W 2050/0083* (2013.01)

(58) Field of Classification Search
CPC . B60W 2050/0006; B60W 2050/0083; B60W 50/0098; B60W 50/045; G05B 13/027; G07C 5/0808
See application file for complete search history.

(56) References Cited

U.S. PATENT DOCUMENTS

| | | | | |
|---|---|---|---|---|
| 9,110,670 B2* | 8/2015 | Myrberg | ............... | G06F 1/3287 |
| 9,785,225 B2* | 10/2017 | Myrberg | ............... | G06F 1/3287 |
| 11,214,196 B1* | 1/2022 | Hadir | ............... | B60R 1/24 |
| 11,630,157 B2* | 4/2023 | You | ............... | G01R 31/3842 |
| | | | | 702/63 |
| 2014/0115372 A1* | 4/2014 | Myrberg | ............. | G06F 11/3058 |
| | | | | 713/340 |
| 2014/0142798 A1* | 5/2014 | Guarnizo Martinez | | |
| | | | | B60W 10/18 |
| | | | | 701/23 |
| 2015/0323980 A1* | 11/2015 | Myrberg | ............. | G06F 11/3058 |
| | | | | 700/295 |
| 2016/0114727 A1* | 4/2016 | Watanabe | ............. | H04N 7/181 |
| | | | | 348/118 |
| 2019/0061621 A1* | 2/2019 | Chae | ............... | H04N 7/181 |
| 2019/0068712 A1* | 2/2019 | Chen | ............... | G07C 5/008 |
| 2020/0096572 A1* | 3/2020 | You | ............... | G01R 31/3842 |
| 2021/0134080 A1* | 5/2021 | Miura | ............... | G01S 7/4086 |
| 2021/0141294 A1* | 5/2021 | Hwang | ............... | B60R 11/04 |
| 2022/0185331 A1* | 6/2022 | Kaiser | ............... | B60W 50/045 |

* cited by examiner

*Primary Examiner* — Tyler J Lee
(74) *Attorney, Agent, or Firm* — Sheppard, Mullin, Richter & Hampton LLP; Xin Xie

(57) ABSTRACT

A computing system is implemented as part of a vehicle architecture. The computing system includes a computing component, a first computing node that includes a power distribution system, a second computing node that includes input/output (I/O) interfaces to connect to devices, actuators, or sensors, and a third computing node. The computing component further comprises one or more processors and instructions or logic that, when executed by the one or more processors, cause the computing component to perform, transmitting commands to the second computing node, the commands associated with initial processing of data received at the second computing node, receiving initially processed data from the second computing node, and performing further processing on the initially processed data.

16 Claims, 9 Drawing Sheets

AUTONOMOUS OR SEMI-AUTONOMOUS VEHICLE ELECTRONIC ARCHITECTURE

BACKGROUND

Traditionally, vehicles rely on multiple electronic control units (ECUs) or electronic control modules (ECMs) to perform operations such as processing, supplying power, and communication. Drawbacks manifested from such a modular approach of having ECUs spread throughout a vehicle include limited computing resources in each ECU, resource expenditures of communicating among ECUs, complexity of harness wiring among the ECUs, high deployment and maintenance costs, and difficulty of supporting cross-domain applications that may involve multiple inputs, applications, or features. This modular approach entails a reliance primarily on serial computing, in which an ECU may process data or execute an instruction, and transmit a result to another ECU for further processing or execution. A number of features and functionalities in vehicles has skyrocketed, as manifested by advancements in software, computers, sensors and actuators. The ability to implement these features and functionalities is becoming constrained due to limits of computing resources in serial computing. Additionally, the higher rates of data traffic and data transmission among the ECUs may lead to risks of compromised security. Moreover, each ECU requires its own power, processing, data, and connectivity. In particular, increasing a number of ECUs also increases the amount of wiring harness, thereby increasing the total weight and space associated with the computing resources. In order to support additional and/or more complex vehicle features and functionalities, such as in autonomous or semi-autonomous driving, simply incorporating an additional ECU is impractical and unsustainable. Therefore, the traditional electronic architecture of relying on separate ECUs needs to be modified.

SUMMARY

Described herein, in some embodiments, is a computing component implemented as part of a vehicle architecture and being connected to the computing nodes. The computing nodes comprise a first computing node that comprises a power distribution system, a second computing node that comprises input/output (I/O) interfaces to connect to devices, actuators, or sensors, and a third computing node. The computing component may further comprise one or more processors; and instructions or logic that, when executed by the one or more processors, cause the computing component to perform, transmitting commands to the second computing node. The commands are associated with initial processing of data received at the second computing node from the devices, actuators, or sensors. The computing component may receive initially processed data from the second computing node and perform further processing on the initially processed data.

In some embodiments, the first computing node comprises second I/O interfaces that connect to temperature sensors and to humidity sensors on the vehicle; and the instructions or logic further cause the computing component to perform: receiving, from the first computing node, an indication of temperatures and humidities at different locations of the vehicle; determining whether to change an amount of air flow or ventilation at a particular location of the vehicle based on the indication of the temperatures and the humidities; and transmitting a second command to the third computing node that indicates whether to change an amount of air flow or ventilation at a particular location of the vehicle, wherein the third computing node changes an amount of air flow or ventilation at a particular location of the vehicle based on the second command.

In some embodiments, the instructions or logic further cause the computing component to perform: receiving, from the first computing node, an indication of temperature gradients and humidity gradients at different locations of the vehicle; and wherein the determination of whether to change an amount of air flow or ventilation at a particular location of the vehicle is further based on the indication of the temperature gradients and the humidity gradients.

In some embodiments, the instructions or logic further cause the computing component to perform: determining a navigation action to be taken in response to further processing of the initially processed data; determining a change in a drive-by-wire (DBW) actuator corresponding to the navigation action to be taken; and transmitting a third command to the second computing node or to the third computing node to indicate the change in the DBW actuator.

In some embodiments, the second computing node or the third computing node implements the change in the DBW actuator according to the third command.

In some embodiments, the instructions or logic further cause the computing component to: receive, from the first computing node, an indication of a voltage transmitted to the second computing node and a second voltage transmitted to the third computing node, the voltage transmitted to the second computing node being indicative of an expected remaining lifespan of the second computing node and the second voltage transmitted to the third computing node being indicative of a second remaining lifespan of the third computing node; and reallocate processing tasks to the second computing node or to the third computing node based on the voltage or the second voltage.

In some embodiments, the instructions or logic further cause the computing component to: receive, from the first computing node, an indication of a third voltage transmitted to the computing component; and wherein the reallocation of processing tasks to the first computing node is further based on the third voltage.

In some embodiments, the instructions or logic further cause the computing component to: determine a processing load of the second computing node and a second processing load on the third computing node; and reallocate processing tasks to the second computing node and to the third computing node based on the processing load and the second processing load.

In some embodiments, the processing tasks are associated with sensor fusion.

In some embodiments, the processing tasks are associated with a simultaneous localization and mapping (SLAM) algorithm In some embodiments, the commands associated with initial processing of data indicate that at least one of JPEG encoding, point cloud registration, and fusion of inertial measurement unit (IMU) and global positioning system (GPS) data, is to be performed.

In some embodiments, the first computing node, the second computing node, and/or the third computing node may be hard-wired to perform the aforementioned techniques, or may comprise circuitry or digital electronic devices such as one or more application-specific integrated circuits (ASICs) or field programmable gate arrays (FPGAs) that are persistently programmed to perform the techniques, or may comprise one or more hardware processors programmed to perform the techniques pursuant to program instructions in firmware, memory, other storage, or a combination. In some embodiments, the first computing node, the second computing node, and/or the third computing node may be programmed using hardware description languages (HDLs).

Various embodiments of the present disclosure provide a method implemented by a computing system as described above.

In some embodiments, a computing system is implemented as part of a vehicle architecture. The computing system comprises a computing component, a first computing node that comprises a power distribution system, a second computing node that comprises input/output (I/O) interfaces to connect to devices, actuators, or sensors, and a third computing node. The computing component further comprises one or more processors; and instructions or logic that, when executed by the one or more processors, cause the computing component to perform: transmitting commands to the second computing node, the commands associated with initial processing of data received at the devices, actuators, or sensors; receiving initially processed data from the second computing node; and performing further processing on the initially processed data. In some embodiments, the further processing may comprise sensor fusion.

These and other features of the apparatuses, systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 2 illustrates a process of point cloud registration while FIG. 3 illustrates a process of generating a map.

DETAILED DESCRIPTION

Figure 1A:
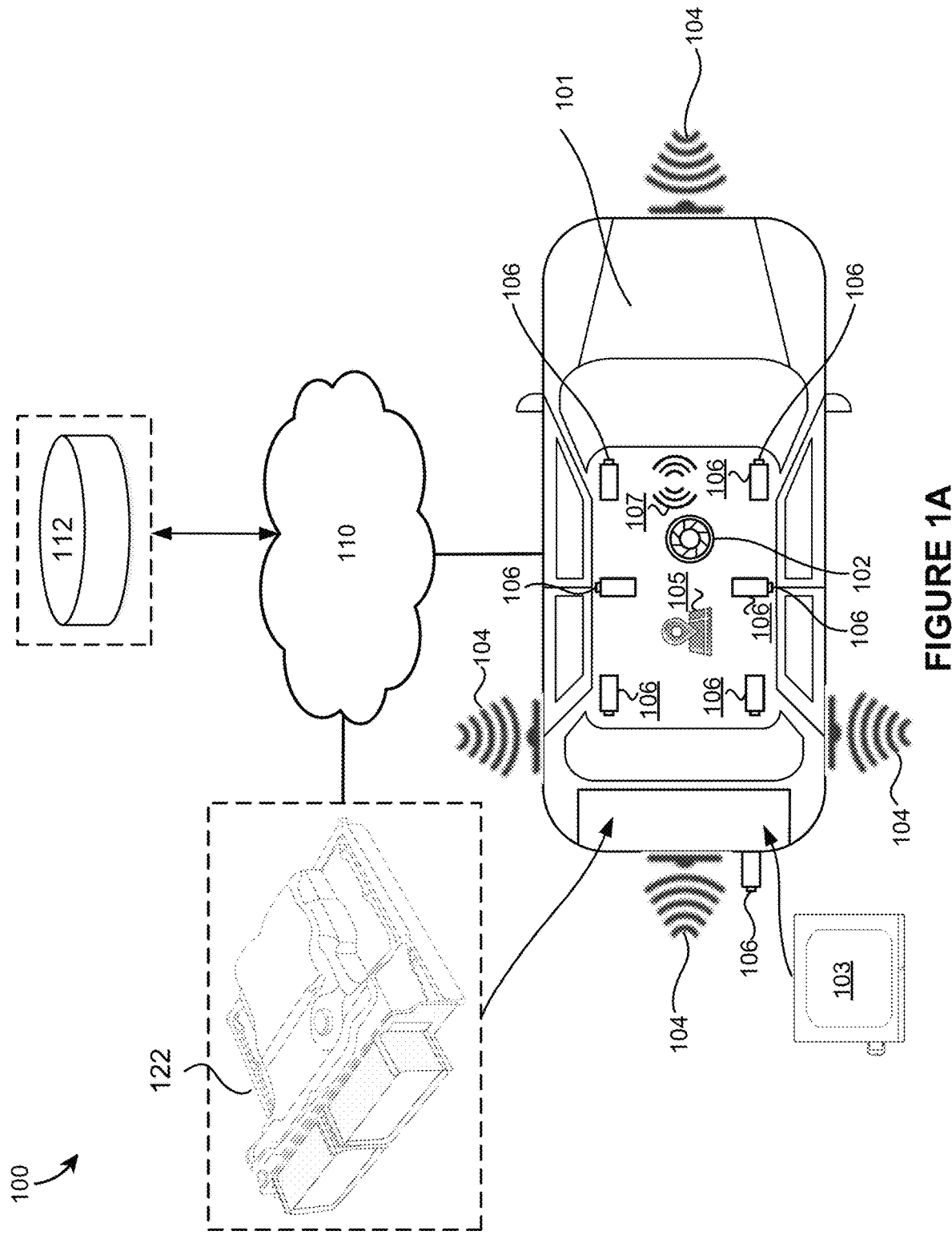
FIG. 1A illustrates an example environment in which a computing architecture of a vehicle may be implemented, according to an embodiment of the present disclosure.

In order to improve existing functionalities and support new features of semi-autonomous or autonomous driving, an electrics/electronics (E/E) architecture may be implemented as a modified topology that includes a central component or central processor (hereinafter "central component") and nodes, such as computing nodes, positioned at particular locations of a vehicle. The central component may include logic or instructions to transmit commands to the nodes and receive response commands from the nodes. Using such a setup would reduce a number of separate ECUs within the vehicle, while reducing a chance of overburdening or overloading the central component, which may be due in part to loads of interrupt handling.

This E/E architecture may exhibit improved performance, efficiency, reliability, safety, fault monitoring, failure isolation, and ease of maintenance and deployment compared to a traditional setup. Such an E/E architecture may reduce overall power consumption, efficiently distribute power and data throughout the vehicle, and delegate processing or other tasks among the nodes. Such a modified topology may reduce a total amount of data transfer, decrease a total weight and length of a wiring harness (e.g., copper wiring), and reduce a number of microcontrollers, power supplies, and housings, thus improving scalability compared to a traditional setup.

The modified topology may abstract software, logic, and/or instructions from the hardware components, in particular, the nodes. As one example, software and/or associated instructions or logic may be implemented agnostic of hardware, or deployed across a diverse range of hardware. In particular, software may be designed specifically to run on a range of hardware meeting particular specifications rather than an exact hardware device. Additionally, in order to update functions or capabilities, software updates and improvements may be released incrementally over-the-air (OTA) to the central component, rather than also having to reconstruct the central component every time a software update or improvement occurs. The modified topology may also facilitate reallocation of computing resources, computing bandwidth, memory and processing such as graphics processing, based on priority and current allocation of tasks or other constraints. Additionally, such a modified topology may include functionalities of combining processing resources from multiple nodes. Accordingly, diverse applications and functions that span different domains may be integrated using the modified topology.

The nodes may serve as data gateways, or hubs, which communicate with, connect, consolidate, and interface actuators, sensors, and peripherals to the central component. As a result, the input/output (I/O) may be offloaded from the central component, thereby decreasing a burden on the central component. In other words, the central component does not have to directly establish communications with each of the actuators, sensors, and peripherals. At least one of the nodes may perform localization, establishing communication with external vehicles or services, interfacing with the central component to transmit and/or receive commands and/or instructions, synchronizing of time, hardware monitoring, and/or data pre-processing. In some embodiments, data pre-processing may include operations such as frame construction or reconstruction, which may be based on a time from a GPS sensor, setting or organizing data packets into headers, footers, and payloads, packaging or prepackaging data, reformatting data, removing extraneous or unreliable portions of data, integrating data such as camera data and radar data, compressing data, encoding or decoding data, encrypting or decrypting data, or transforming data, such as performing a rigid body transformation in a simultaneous localization and mapping (SLAM) algorithm. At least one of the nodes may act as a power distribution system, and/or may supply and monitor power, temperature, thermal flow, humidity, and/or ventilation or airflow throughout the vehicle, and regulate the aforementioned parameters. Exemplary power distribution systems are described in application Ser. No. 17/039,807 filed on Sep. 30, 2020, and application Ser. No. 17/039,810 filed on Sep. 30, 2020, which are hereby incorporated by reference in their entireties.

A central component of a vehicle, which may act at least in part, for example, as an electronic control module (ECM), may process data transmitted by any of the nodes. In some embodiments, the data may include sensor data such as camera data, LiDAR data, radar data, GPS data, and/or data from sonars, ultrasonic sensors, IMUs, FIR sensors, accelerometers, gyroscopes, or magnetometers. To streamline the processing of sensor data, one or more of the nodes may preprocess and/or package the sensor data into portions that facilitate efficient processing of such data before transmitting the preprocessed and/or packaged sensor data to the central component. For example, a node may preprocess the sensor data, store the preprocessed sensor data in a memory (e.g., storage or datastore) associated with the node, and/or package, assemble, or bundle, the preprocessed sensor data. The preprocessing of the sensor data may encompass encoding the sensor data, such as, encoding raw image or video data, into a JPEG (Joint Photographic Experts Group) format. Either the node may transmit the preprocessed and/or packaged sensor data, or the central component may retrieve the preprocessed and/or packaged sensor data from the memory. In order for the central component to retrieve the preprocessed and/or packaged sensor data from a proper segment of the memory, whichever node or nodes is associated with the memory may transmit an indication or message of the addresses of the memory in which the preprocessed and/or packaged sensor data is located.

In some embodiments, the prepackaging of the sensor data may include timestamp synchronization, which may entail embedding, appending or synchronizing each frame of data with a time provided by the GPS sensor. For example, the prepackaging of the sensor data may involve checking consistency between the time provided by the GPS sensor and a time provided by that sensor itself. As a particular example, a frame of data captured by LiDAR may have an internal LiDAR timestamp. Such an internal LiDAR timestamp may be synchronized, or checked to ensure consistency with, the time provided by the GPS sensor. Such a consistency check may be based on historical data. For example, if the time provided by the LiDAR timestamp has historically deviated by 0.1 milliseconds with respect to the time provided by the GPS sensor, the time provided by the LiDAR timestamp may be adjusted by 0.1 milliseconds to match the time provided by the GPS sensor. As another example, if the time provided by the LiDAR timestamp historically exhibits a drift at a rate of 0.1 milliseconds per 10 days with respect to the time provided by the GPS sensor, the time provided by the LiDAR timestamp may be adjusted to account for such a drift. Thus, the GPS sensor may be a source of truth, and/or a sanity check. Such a consistency check may take place even if a reading from the GPS sensor is unavailable because an amount of adjustment of the time provided internally by that sensor may be estimated in an attempt to match the time that would be provided by the GPS sensor.

In some embodiments, two or more different nodes may share a memory. For example, if two nodes are cooperatively performing some type of pre-processing together, the two nodes may share a memory to store the preprocessed data. Whether or not a memory belongs to a single node or is shared among multiple nodes, the memory may be dynamically allocated depending on an amount of sensor data, a size of a sensor data stream, and/or actual information content of the sensor data. For example, if the sensor data is capturing a busy street, an amount of memory allocated may be larger compared to a scenario in which the sensor data is capturing open or sparse regions. Additionally, if the sensor data includes multiple modalities or streams, such as multiple LiDAR and multiple cameras capturing data simultaneously, an amount of memory allocated may be larger compared to a scenario in which the sensor data only includes a single modality and/or a single stream. Therefore, the central component may need to determine a proper segment, or proper addresses, of the memory from which to retrieve the sensor data, because the central component may not be able to retrieve from a same address and/or a same size segment of the memory every time the computing system is trying to obtain sensor data from the memory. To elucidate an exemplary assembly of the central component and the nodes, FIG. 1A illustrates an example environment 100 of an architecture as implemented in a vehicle.

In FIG. 1A, a vehicle 101 such as an autonomous vehicle may include sensors such as LiDAR sensors 102, an inertial measurement unit (IMU) 103, radar sensors 104, a GPS or GNSS sensor (hereinafter "GPS sensor") 105, cameras 106, antennae 107 such as radio antennae to support radiofrequency (RF) communications such as communications to and from the GPS sensor 105 and/or LTE devices, accelerometers, gyroscopes, magnetometers, and FIR (far infrared) sensors to detect and identify objects in a surrounding environment. The sensor data may include pictorial or image data such as pictures or videos, audio data, audiovisual data, timestamp data, and/or other data indicating a position and/or pose of the vehicle 101 captured in either real-time or with a time delay. The vehicle 101 can also include myriad actuators to propel and navigate the vehicle 101 in the surroundings. Such actuators may include, for example, any suitable electro-mechanical devices or systems such as actuators including drive-by-wire (DBW) actuators to control a throttle response, a braking action, or a steering action, just to name some examples.

The environment 100 may also include one or more servers 112 accessible to a central component 122. The one or more servers 112 may store frames of data from the sensors of the vehicle 101. The one or more servers 112 may be accessible to the central component 122 either directly or over the communication network 110. In some instances, the one or more servers 112 may include federated data stores, databases, or any other type of data source from which data may be stored and retrieved, for example. In some embodiments, the one or more servers 112 may store raw sensor data, preprocessed sensor data, processed sensor data, and/or integrated or fused sensor data. In some examples, the one or more servers 112 may store processed sensor data following processing by the central component 122. In particular, the central component 122 may retrieve the processed sensor data from the servers 112 in order to determine and/or coordinate certain actions of the vehicle 101. In some examples, additionally or alternatively, the servers 112 may store preprocessed data from the nodes. In such a scenario, the central component 122 may or may not further process the preprocessed data. For instance, the central component 122 may directly utilize the preprocessed data without further processing in order to determine and/or coordinate certain actions of the vehicle 101. As a particular illustrative scenario, one or more of the nodes may preprocess camera images by JPEG encoding, filtering, and/or removing noise from the camera images. Either one or more of the nodes may store such preprocessed camera images in the servers 112, or the central component 122 may retrieve the preprocessed camera images and store them in the servers 112. In some embodiments, the central component 122 may simply directly utilize the preprocessed camera images, without further processing, to determine and/or coordinate certain actions of the vehicle 101.

In general, a user operating a computing device can interact with the central component 122 over the communication network 110, for example, through one or more graphical user interfaces and/or application programming interfaces. The central component 122 may include one or more processors such as a graphics processing unit (GPU) and/or a central processing unit (CPU). The central component 122 may include, for example, an integrated circuit containing a high-performance microprocessor or microcontroller such as a graphical processing unit (GPU) capable of executing algorithms that require processing large blocks of data (e.g., sensor data) in parallel, for example. In some example embodiments, the central component 122 may include multiple types of processing units such as GPUs and CPUs potentially distributed across multiple computing devices and in communication with one another via one or more communication buses. The central component 122 may, additionally or alternatively, include a field-programmable gate array (FPGA) and/or an application-specific integrated circuit (ASIC). In some embodiments, the central component 122 may retrieve, read, copy, and/or obtain preprocessed sensor data from a storage associated with one or more nodes, or from the servers 112. The central component 122 may perform processing such as, to name some examples, sensor data fusion, or machine learning such as deep learning, which may include functions of convolutional neural networks (CNN). The central component 122 may have software, instructions, or logic, so that the central component 122 is equipped to perform processing functions, transmit commands to, and receive commands from, the nodes. The functions of the central component 122 will be described further in the subsequent figures. Engines/program modules as described below can be implemented in any combination of hardware, software, and/or firmware. In certain example embodiments, one or more of these engines/program modules can be implemented, at least in part, as software and/or firmware modules that include computer-executable instructions that when executed by a processing circuit cause one or more operations to be performed. A system or device described herein as being configured to implement example embodiments of the invention can include one or more processing circuits, each of which can include one or more processing units or cores. Computer-executable instructions can include computer-executable program code that when executed by a processor core can cause input data contained in or referenced by the computer-executable program code to be accessed and processed by the processor core to yield output data. In some embodiments, the central component 122 may include general purpose logic or instructions, and may be non-cycle accurate. Functions of the nodes, which, as alluded to above, carry out I/O, preprocessing of data, power monitoring and distribution, and temperature, humidity, and ventilation monitoring and control, are described below with respect to the subsequent FIGS.

Figure 1B:
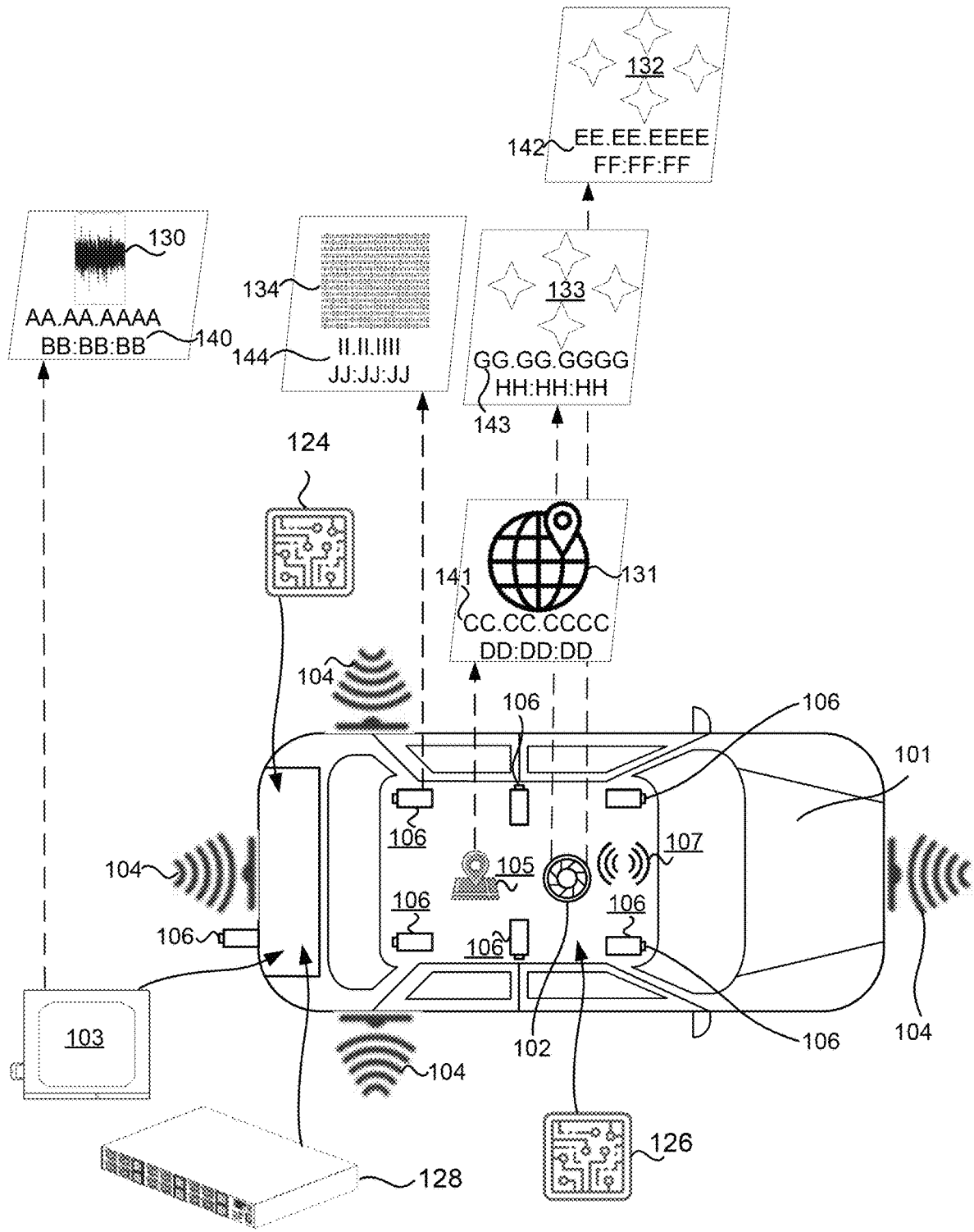
FIG. 1B illustrates a hybrid data flow and block diagram that elucidates a functionality of computing nodes, in particular regarding the preprocessing of sensor data from the vehicle, according to an embodiment of the present disclosure.

FIG. 1B illustrates a hybrid data flow and block diagram that elucidates a functionality of the nodes, in particular regarding the preprocessing of sensor data from the vehicle 101, in accordance with an example embodiment. In FIG. 1B, nodes 124, 126, and 128 may include hardware processors, encompassing any one or more of CPUs, GPUs, FPGAs, and ASICs. Either the node 124 or the node 126 may be implemented as the second computing node as claimed, or as the third computing node. The nodes 124, 126, and 128 may receive commands from the central component 122, which may be, for example, in a form of bit streams. The nodes 124, 126, and 128 may execute the commands and transmit an updated status regarding performance of the commands to the central component 122. In some embodiments, one or more of the nodes 124, 126, and 128 may include a FPGA including custom logic specifically configured to perform a particular task or tasks. In some embodiments, one or more of the nodes 124, 126, and 128 may be cycle accurate. In some embodiments, the nodes 124 and 126 may preprocess sensor data or other data. One example of preprocessing sensor data, as alluded to above, may include appending the sensor data with valid timestamps, such as, from the GPS sensor 105. The preprocessed sensor data may include, without limitation, odometry data 130 and 131 from the IMU 103 and the GPS sensor 105, respectively, and having respective timestamps 140 and 141. The preprocessed sensor data may further include two-dimensional (2-D) or three-dimensional (3-D), or 2-D/3-D point cloud frames 132 and 133 captured by the LiDAR sensors 102 and having respective timestamps 142 and 143. The preprocessed sensor data may further include camera data 134 captured by the camera 106 and having a timestamp 144. The sensor data fed, directed, or transmitted to the nodes 124 and 126 may be preprocessed to save computing resources of the central component 122. The preprocessing, or preliminary processing/initial processing, by the nodes 124 and 126 may, additionally or alternatively, include encoding the sensor data, packaging, assembling, or bundling the sensor data, and/or integrating or fusing the sensor data. The encoding may include, for example, encoding image or video data such as the camera data 134 into JPEG format, or encoding or compressing point cloud data such as the point cloud frames 132 and 133 from the LiDAR sensors 102. The packaging, assembling, or bundling the sensor data may include, for example, creating or generating a thumbnail image using one image or a sequential series of images. The generation of a thumbnail image is described in application Ser. No. 17/325,093, filed on May 19, 2021, hereby incorporated by reference in its entirety. The packaging, assembling, or bundling the sensor data may include, organizing data from different modalities (e.g., sensors, actuators, and devices) into a single frame and indicating which portion of that frame corresponds to each modality. For example, the node 126 may indicate that GPS data corresponds to, and is present at, a particular portion of a frame, while LiDAR data corresponds to, and is present at, an other portion of that frame. In some embodiments, the nodes 124 and 126 may transmit different formats or organizations of data in a single frame. For example, the node 126 may transmit DBW data indicating an extent that a pedal such as an accelerator has been pushed, while simultaneously transmitting JPEG-encoded camera data within a same frame. In such a manner, the nodes 124 and 126 may conserve transmission time by integrating data from different modalities in a single frame. Meanwhile, the integrating or fusing of the sensor data may include, for example, combining sequential frames of image or video data and/or point cloud data, and/or fusing the image or video data and/or the point cloud data. Such integration or fusion may involve collaboration among different nodes. Thus, at least some of the preprocessing functions that would otherwise be carried out by the central component 122 may be offloaded to the nodes 124 and 126 in order to conserve some of the computing resources of the central component 122. Meanwhile, the node 128 may include a power distribution system that performs, without limitation, power monitoring and distribution, and temperature, humidity, and ventilation monitoring. The node 128 may control temperature, humidity, and ventilation both throughout the power distribution system and throughout the vehicle 101 in particular locations.

Figure 1C:
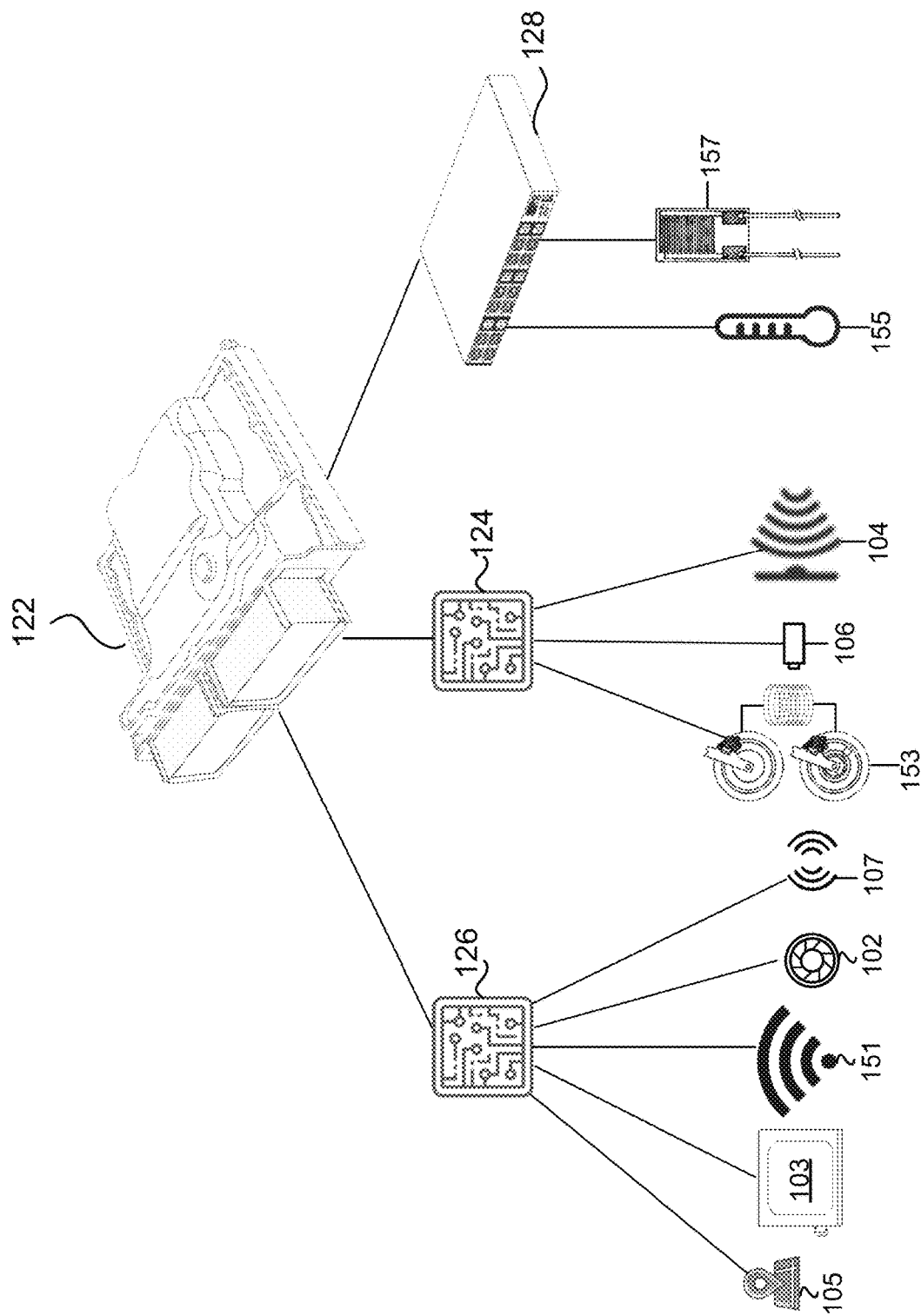
FIG. 1C illustrates an exemplary arrangement of the computing nodes, and a central component, in which particular functions may be flexibly or adaptively offloaded from the central component to the computing nodes, according to an embodiment of the present disclosure.

FIG. 1C illustrates an exemplary arrangement of the nodes 124, 126, and 128, and the central component 122, in which particular functions may be flexibly or adaptively offloaded from the central component 122 to the nodes 124 and 126. Each of the nodes 124, 126, and 128 may electrically connect, and directly or indirectly physically connect, to the central component 122 via a harness or wiring. The harness or the wiring may also electrically and physically connect the node 126 to sensors, actuators, and/or devices which include, the GPS sensor 105, the IMU 103, a communication device 151 such as a Long Term Evolution (LTE) device, the LiDAR sensor 102, and the antennae 107. The node 126 may be connected to multiple aforementioned components of each type, such as, multiple LiDAR sensors. The harness or the wiring may also electrically and physically connect the node 124 to sensors, actuators, and/or devices which include, DBW components 153 such as actuators, the camera 106, and the radar sensor 104. Because an amount of camera data that is processed in a vehicle may be higher than an amount of data from any other modality, the node 124 may be positioned to be closest to the central component 122, compared to the node 126 and the node 128. Thus, because transmission of camera data may be more frequent and involve a higher volume than transmission of any other type of data, delays associated with transmission of camera data would be reduced by positioning the node 124 in proximity to the central component 122. The node 124 may be connected to multiple aforementioned components of each type, such as, multiple cameras. The harness or the wiring may also electrically and physically connect the node 128 to sensors, actuators, and/or devices which include, a temperature sensor 155 and a humidity sensor 157. The node 128 may include a power distribution system as alluded to above. Although only one harness or wiring from the node 128 is shown, separate wires may be utilized for data transmission and for power distribution from the node 128. In particular, a first wire originating from the node 128 may transmit data to, and receive data from, the central component 122, while a second wire originating from the node 128 may distribute power to the central component 122, the nodes 124 and 126, along with other devices, sensors, and actuators connected to the nodes 124, 126, and 128.

As previously alluded to, the central component 122 may include software, instructions, or logic to coordinate functions of any of the nodes 124, 126, and 128. In particular, the central component 122 may transmit commands to the nodes 124, 126, and 128 to perform certain functions. The commands may be transmitted via a series of bitstreams to the nodes 124, 126, and 128, in particular, to chips, such as input/output (I/O) chips, on or associated with the nodes 124, 126, and 128. For example, one series of bitstreams may provide instructions of a frequency at which to acquire sensor data to a particular sensor, and another series of bitstreams may provide instructions of whether or not a particular node is to fuse sensor data. The nodes 124, 126, and 128 may transmit a response frame, or response commands, including a status of the received command, and any data requested by the computing component 122. For example, the node 124 may transmit a response frame that includes frames of JPEG-encoded camera data, GPS data, and IMU data incorporated into a frame, along with timestamps corresponding to the camera data, the GPS data, and the IMU data. The node 124 may further indicate portions of the frame that belong to the GPS data, the IMU data, and the camera data. The response frame may further indicate whether or not the requested data as indicated in the command transmitted by the computing component 122 was successfully acquired, from which particular sensor, device, or actuator the requested data was acquired, parameters such as actual frequency at which the data was acquired, delays associated with the acquisition and/or transmission, a bandwidth over which transmission of the data occurred, and/or a particular memory address at which the data is stored so that the computing component 122 can retrieve the data. The computing component 122 may either transmit the commands from user input or transmit the commands automatically. In such a manner, the computing component 122 may offload certain functions or processing to any of the nodes 124 and 126. Such offloading may be based on a health status, expected lifespan (e.g., expected remaining lifespan), and/or current loads, such as processing loads, of the computing component 122 and/or of the nodes 124 and 126. The health status and/or expected lifespan may be based on parameters from the node 128. For example, the node 128 may report such parameters to the computing component 122, either automatically or upon request from the computing component 122. These parameters may include an amount of voltage transmitted to each of buses corresponding to, and/or connected to, the nodes 124 and 126, the computing component 122, and/or corresponding to individual components, devices, actuators, or sensors connected to the nodes 124, 126, and 128. In some embodiments, an amount of voltage transmitted to a bus corresponding to a particular node may be equivalent to, or indicative of, an amount of voltage transmitted to that particular node. A lower an amount of voltage transmitted to a bus, a lower the health status and/or expected lifespan would be on the node corresponding to that bus. In some embodiments, the nodes 124 and 126 may individually determine whether or not inputs such as data inputs are being successfully received from each of the sensors, devices, or actuators connected to the respective nodes 124 and 126 and report such status to the computing component 122. In some embodiments, the central component 122 may determine a current load on each of the nodes 124, 126, and 128 based on an amount of, a type of, or a nature of, tasks assigned to each of the nodes 124, 126, and 128. In a particular scenario, if a health and/or expected lifespan of the computing component 122 is below a certain threshold, but a corresponding health and/or expected lifespan of the node 126 is above a second threshold, then the computing component 122 may offload certain processing functions such as sensor fusion of GPS and IMU data to the node 126. In some embodiments, if one of the nodes 124 or 126 fails, then the computing component 122 may take over functions that were previously delegated to that node, such as preprocessing, or assign such functions to an other node that is still functional. In some embodiments, if the central component 122 fails, then either a backup central component would take over functions previously delegated to the central component 122, or, one of the nodes 124 or 126 would resume such functions. For example, either or both of the nodes 124 and 126 may receive an indication, such as one or more bitstreams, from the node 128 that the central component 122 has compromised or no functionality because of a reduced voltage, or no voltage, delivered to a bus corresponding to, or connected to, the central component 122. Accordingly, either or both of the nodes 124 and 126 may take over some or all functions that were previously assigned to the central component 122.

In some embodiments, the node 128 may monitor temperature, humidity, ventilation, and/or circulation throughout the vehicle 101 via data from sensors located at different portions of the vehicle 101. The node may transmit such data to the central component 122. The data may include, a temperature or humidity, a derivative of a temperature or humidity with respect to a change in time or location (e.g., spatial coordinates), or a gradient of the temperature or humidity. The central component 122 may, in turn, based on this data, transmit commands to the node 128, to open or increase access from an air conditioning (AC) or cabin vent, or otherwise increase or decrease the circulation of air to adjust a temperature or humidity, a derivative of a temperature or humidity with respect to a change in time or location (e.g., spatial coordinates), or a gradient of the temperature or humidity to be within a permitted threshold range.

After the central component 122 either completes processing of data received from the nodes 124, 126, and 128, or receives already processed data from the nodes 124, 126, and 128, the central component 122 may determine a navigation action to be taken and determine a change in a drive-by-wire (DBW) actuator (e.g., the DBW actuator 153) corresponding to the navigation action to be taken. The central component 122 may further transmit a command to the node 124 to indicate such a change in the DBW actuator 153. For example, if the central component 122 processes data that indicates inclement weather, high traffic (e.g., higher than a threshold level of traffic), or an emergency such as a crime, the central component 122 may determine that the vehicle 101 is to slow down, change route, or pull over. The central component 122 may then determine what type of action, such as pushing or pulling, to be taken on the DBW actuator 153. In particular, the central component 122 may determine an extent to which the DBW actuator 153 is to be moved or adjusted, a corresponding force or torque to be applied to the DBW actuator 153, and a time at which the DBW actuator 153 is to be moved or adjusted. The central component 122 may instruct the node 124 to move or adjust the DBW actuator by the determined extend, and/or to apply the corresponding force or torque. The node 124 may transmit to the central component 122 an indication of whether the instruction was performed successfully. The central component 122 may then obtain updated GPS data from the node 126 indicating a position and/or orientation of the vehicle 101 to confirm that the vehicle 101 performed the navigation action successfully.

Figure 2:
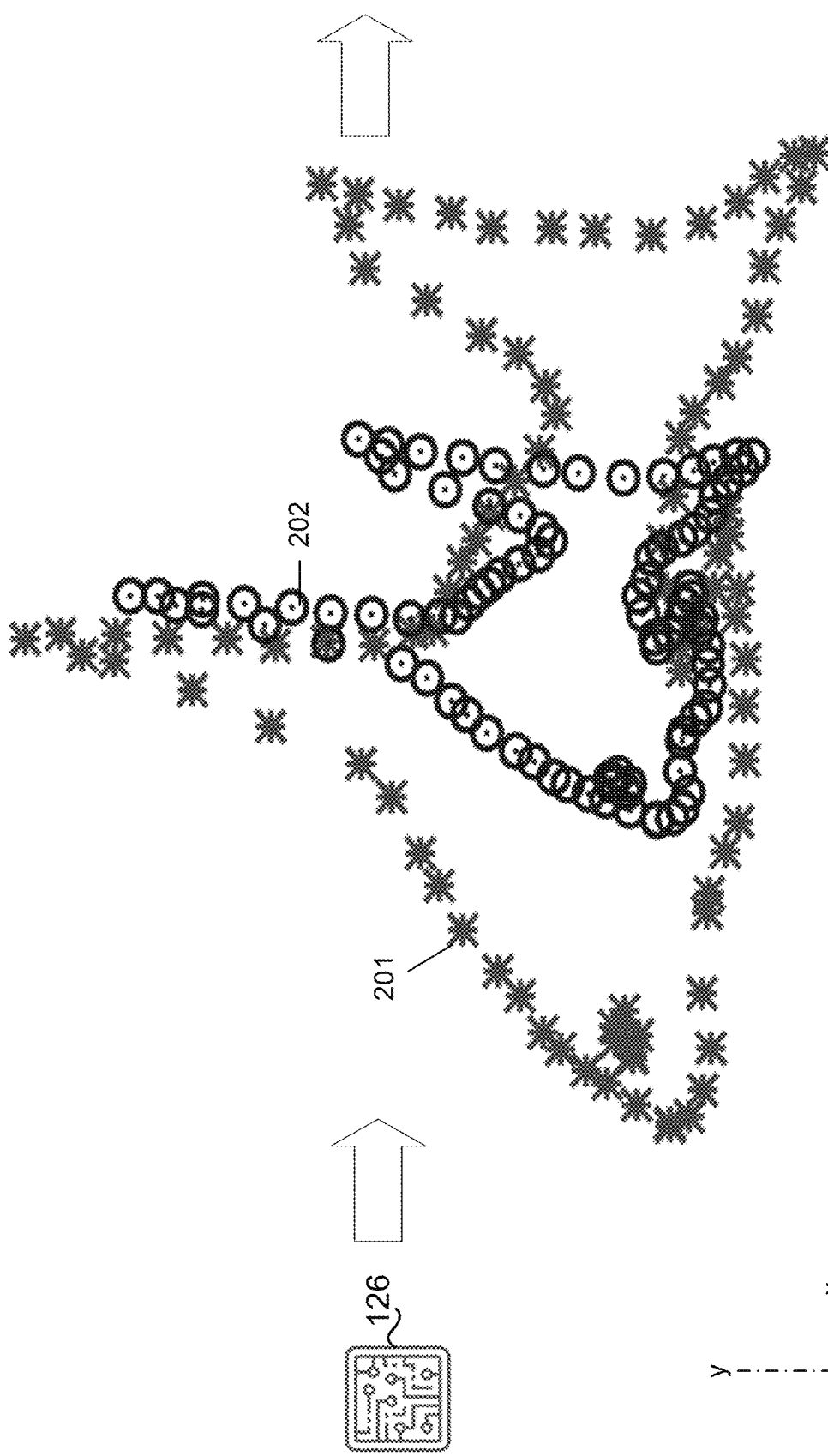
FIGS. 2-3 illustrate a particular scenario of how tasks of a simultaneous localization and mapping (SLAM) algorithm may be allocated in the architecture described in FIGS. 1A-1C, according to an embodiment of the present disclosure.
Figure 2:
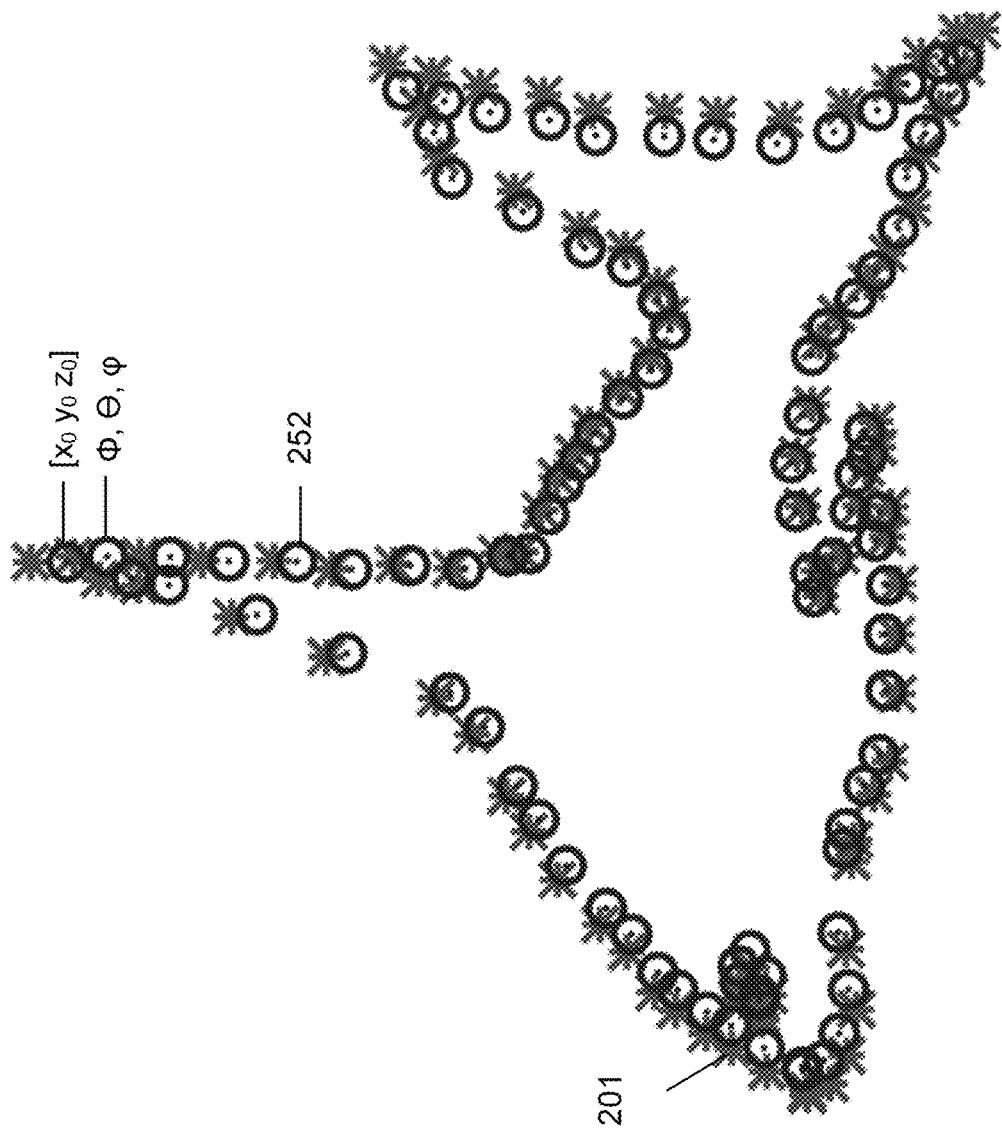
Figure 3:
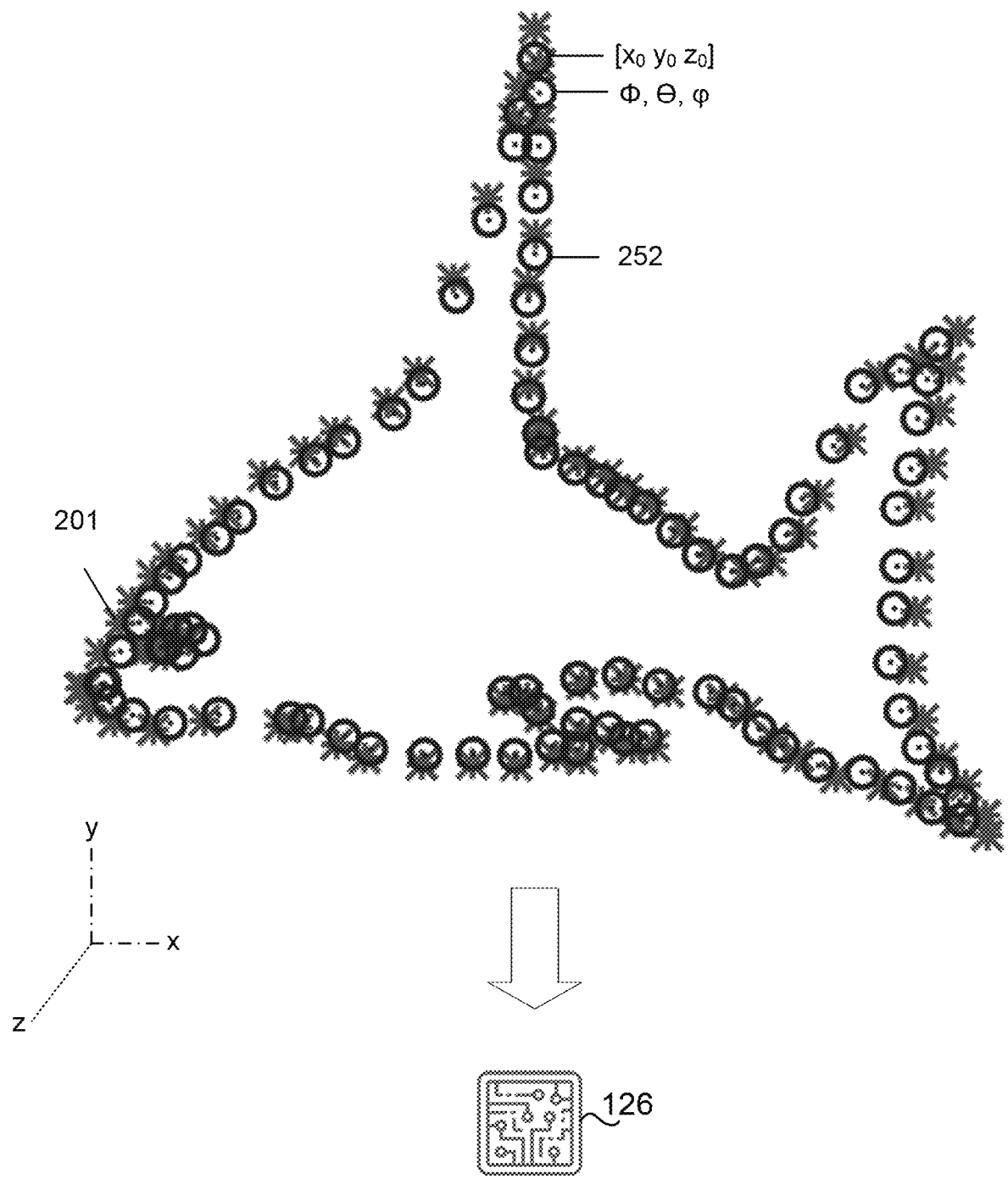
Figure 3:
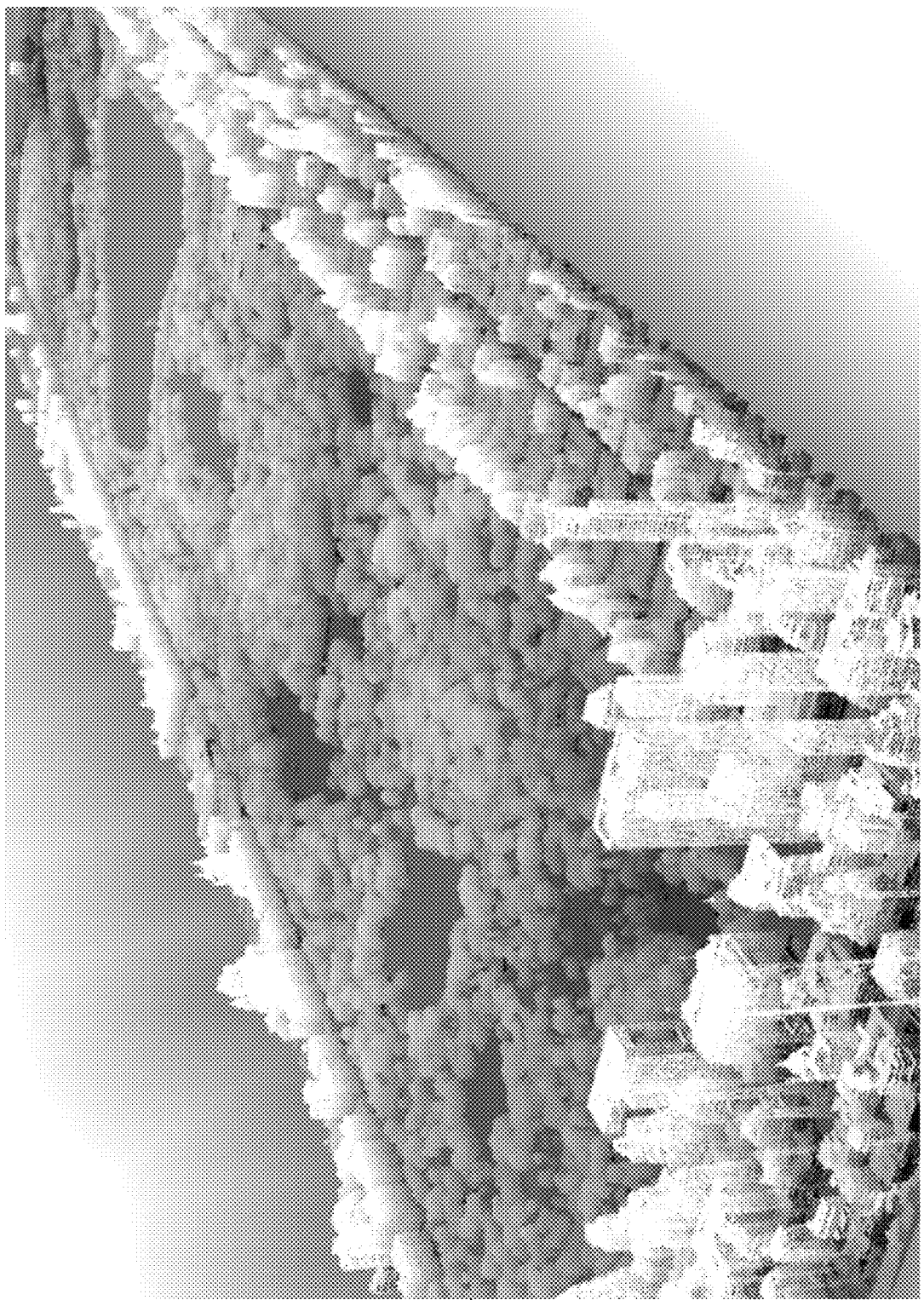

FIGS. 2-3 illustrates a particular scenario of how tasks of a SLAM algorithm may be allocated in the architecture described in FIGS. 1A-1C. Details of an exemplary SLAM algorithm are described, for example, in application Ser. No. 17/124,444, which is hereby incorporated by reference in its entirety. In some embodiments, the node 126 may perform operations such as, fusion of IMU data and GPS data, determining and/or satisfying or minimizing constraints associated with fused IMU/GPS data and loop closure constraints, point cloud registration or rigid body transformation, and/or determining positions and orientations of point clouds following the point cloud registration or rigid body transformation. The point cloud registration, as shown in FIG. 2, may involve a rotation and a translation to align one point cloud, a target point cloud, to another point cloud, a source point cloud. In FIG. 2, point clouds 201 and 202 that are initially unaligned and have different origins are registered by a rigid transformation of the point cloud 202. The rigid transformation may include a translation and rotation of the point cloud 202 to align with the point cloud 201 as closely as possible. Here, the point cloud 201 may be a source, or an earlier point cloud, and the point cloud 202 may be a target, or a later point cloud that is transformed to be aligned with the point cloud 201. Following a transformation of the point cloud 202, a transformed point cloud 252 may be aligned with the point cloud 201. Outliers and background data from one or both of the point clouds 201 and 202 may be detected and filtered following an initial transformation, and following removal of outliers and background data, the registration process may be repeated. The determination of positions and/or orientations of the point cloud 202 may be based on an amount of rotation and/or translation during the point cloud registration process from the point cloud 202 to the transformed point cloud 252. For example, a position $[x_0\ y_0\ z_0]$ may indicate an absolute or a relative position of the point cloud 202, such as a center of the point cloud 202. If the position $[x_0\ y_0\ z_0]$ indicates a relative position of the point cloud 202, then the relative position may be with respect to the point cloud 201 or with respect to another feature. Meanwhile, an orientation, as defined by angles $\Phi, \Theta, \varphi$ indicating a rotation of the point cloud 202 relative to the point cloud 201 with respect to an x-axis, a y-axis, and a z-axis, respectively. The node 126 may transmit, to the central component 122, the resulting positions and orientations of the point clouds.

In FIG. 3, the central component 122 may receive the positions and orientations of the point clouds and generate a map 302. In some embodiments, the central component 122 may, based on current loads, available resources, and operational parameters of the node 126, such as, a health or expected lifespan of the node 126, take over any functions that were originally delegated or assigned to the node 126, such as, point cloud registration or rigid body transformation, determining and/or satisfying or minimizing constraints associated with fused IMU/GPS data and loop closure constraints, and/or fusion of IMU data and GPS data. For example, if most or all the available computing resources of the node 126 that are specifically equipped or configured to handle point cloud registration are currently occupied on other tasks, such as, fusion of other sensor data, then the central component 122 may take over the point cloud registration or rigid body transformation. Such reassignment of functions may further be based on current loads and operational parameters of the computing component 122, such as, a health or expected lifespan of the computing component 122. The computing component 122 may transmit a command, such as a series of bitstreams, to the node 126 in order to indicate which functions the computing component 122 is reassigning either to itself or to an other node.

Figure 4:
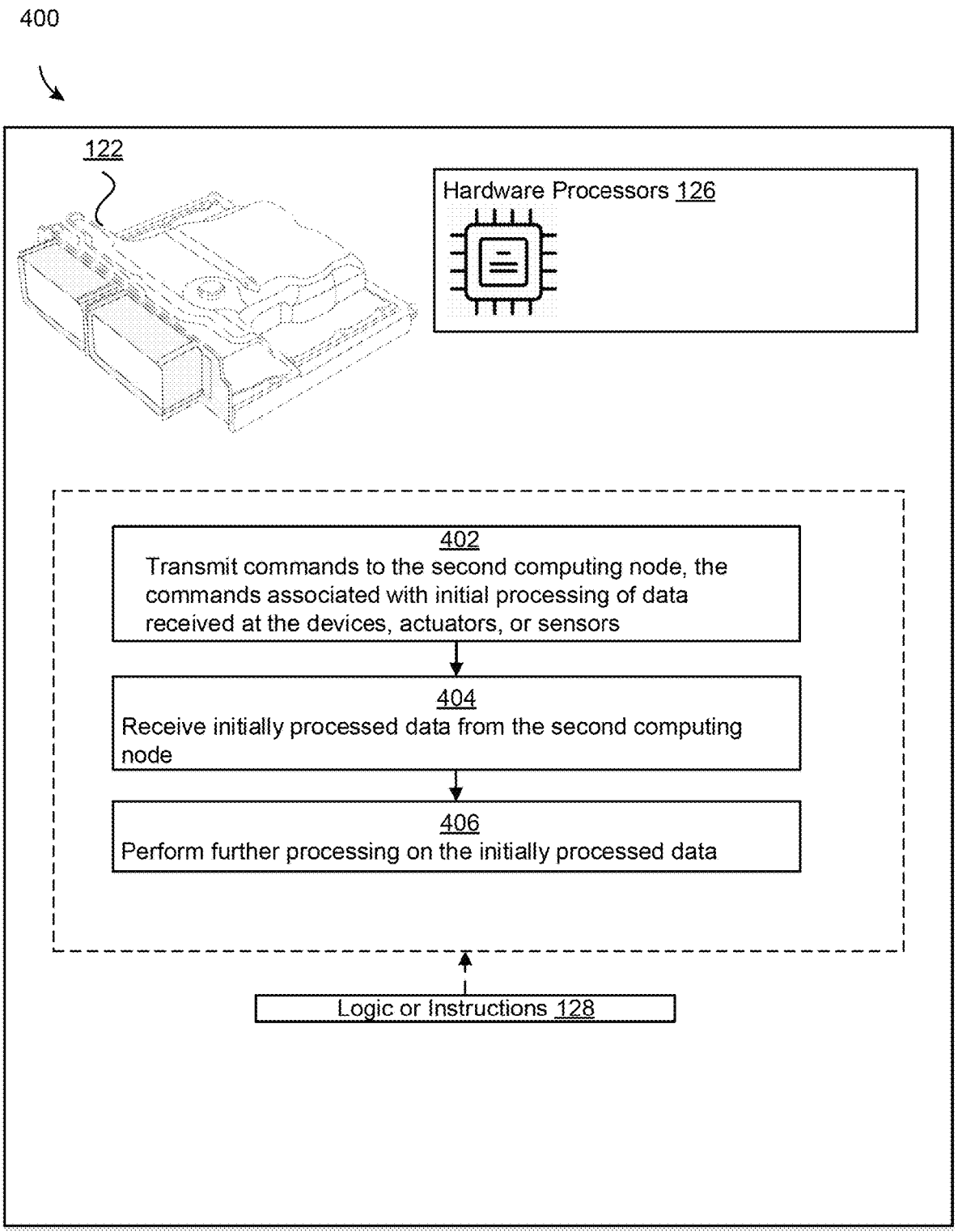
FIG. 4 illustrates a flowchart of a method of coordinating operations on a vehicle, as well as associated steps, as performed by the central component, in accordance with an example embodiment of the present disclosure.

FIG. 4 illustrates a flowchart 400 of a method of coordinating operations on a vehicle, as well as associated steps, as performed by the central component 122. The central component 122 may include one or more hardware processors 126, which may be programmed to perform particular functions in accordance with program logic or instructions 128 stored in firmware, memory, other storage, or a combination. In step 402, the central component 122 may transmit commands to a second computing node, the commands associated with initial processing of data received at the devices, actuators, or sensors. The second computing node may be implemented as the node 124 or the node 126, and may include input/output (I/O) interfaces to connect to devices, actuators, or sensors, as illustrated, for example, in FIG. 1C. The commands may instruct the second computing node to perform initial processing on data, such as, encoding, encryption, integration, fusion, or packaging of data, as previously alluded to. In step 404, the central component 122 may receive initially processed data from the second computing node. In step 406, the central component 122 may perform further processing on the initially processed data. The further processing may augment the initially processed data and assist the central component 122 in determining a navigation action to be taken on the vehicle 101.

The techniques described herein, for example, are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination.

Figure 5:
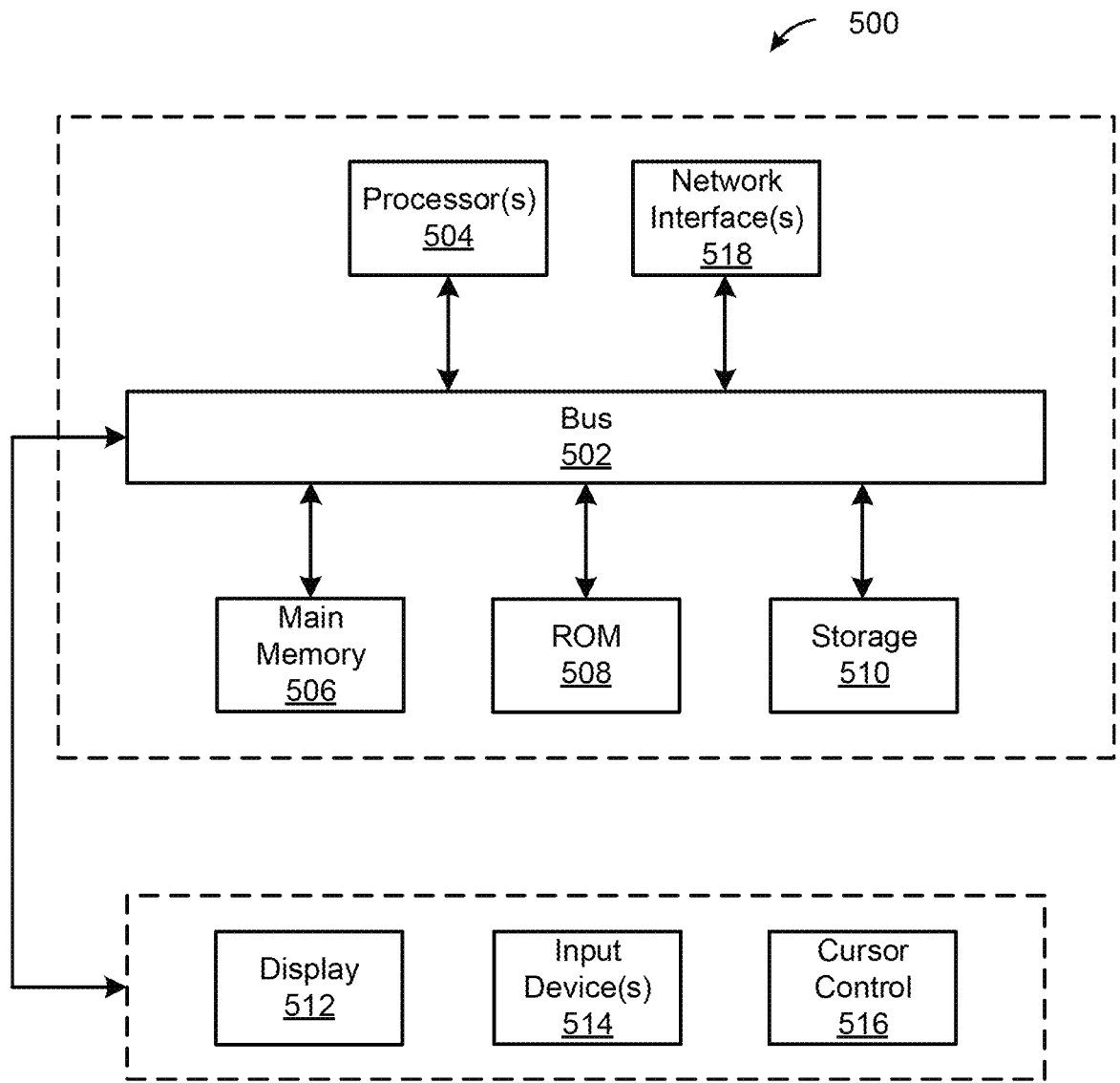
FIG. 5 illustrates a block diagram of a computer system upon which any of the embodiments described herein may be implemented.

FIG. 5 illustrates a block diagram of a computer system 500 upon which any of the embodiments described herein may be implemented. For example, a subset or an entirety of the computer system 500 may be implemented in the central component 122. The computer system 500 includes a bus 502 or other communication mechanism for communicating information, one or more hardware processors 504 coupled with bus 502 for processing information. A description that a device performs a task is intended to mean that one or more of the hardware processor(s) 504 performs that task. The hardware processor(s) 504 may be hard-wired to perform techniques described in the Specification; they may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The hardware processor (s) 504 may also combine custom hard-wired logic, ASICs, or FPGAs with custom programming to accomplish the techniques. The hardware processor(s) 504 can include any suitable processing unit capable of accepting data as input, processing the input data in accordance with stored computer-executable instructions, and generating output data. The hardware processor(s) 504 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the hardware processor(s) 504 can have any suitable microarchitecture design that includes any number of constituent components such as, for example, registers, multiplexers, arithmetic logic units, controllers for controlling read/write operations to memory, branch predictors, or the like. The microarchitecture design of the hardware processor(s) 504 can be made capable of supporting any of a variety of instruction sets.

The computer system 500 also includes a main memory 506, such as a dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to output device(s) 512, such as a cathode ray tube (CRT) or LCD display (or touch screen), for displaying information to a computer user. Input device(s) 514, including alphanumeric and other keys, are coupled to bus 502 for communicating information and command selections to processor 504. Another type of user input device is cursor control 516. The computer system 500 also includes a communication interface 518 coupled to bus 502.

The term "engine" or "program module" should be understood to encompass a tangible entity, be that an entity that is physically constructed, permanently configured (e.g., hard-wired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiment.

A component or aspect being implemented as another component may be construed as the component or aspect being operated in a same or similar manner as the another component or aspect, and/or comprising same or similar features, characteristics, and parameters as the another component.

The invention claimed is:

1. A computing component implemented as part of a vehicle architecture, the computing component being connected to and coordinating computing nodes, the computing nodes comprising instructions or logic that configure the computing nodes to perform computing functions, the computing nodes comprising:
  a first computing node that comprises a power distribution system;
  a second computing node that comprises one or more input/output (I/O) interfaces to connect to one or more devices, actuators, or sensors; and
  a third computing node; and
the computing component further comprising:
  one or more processors; and
  instructions or logic that, when executed by the one or more processors, cause the computing component to perform:
    transmitting commands to the second computing node, the commands associated with initial processing of data received at the second computing node from the devices, actuators, or sensors;
    receiving initially processed data from the second computing node;
    performing further processing on the initially processed data;
    offloading one or more previously assigned computing tasks from the second computing node or the third computing node based on respective health statuses and processing loads of the second computing node and the third computing node, wherein the second computing node or the third computing node that previously had performed the one or more previously assigned computing tasks; and
    allocating the offloaded one or more previously assigned computing tasks to the third computing node or the second computing node.

2. The computing component of claim 1, wherein the instructions or logic further cause the computing component to:
  receive, from the first computing node, an indication of a voltage transmitted to the second computing node and a second voltage transmitted to the third computing node, the voltage transmitted to the second computing node being indicative of an expected remaining lifespan of the second computing node and the second voltage transmitted to the third computing node being indicative of a second remaining lifespan of the third computing node; and
  offload the one or more previously assigned computing tasks from the second computing node or to the third computing node based on the voltage or the second voltage.

3. The computing component of claim 2, wherein the instructions or logic further cause the computing component to:
  receive, from the first computing node, an indication of a third voltage transmitted to the computing component; and
  wherein the reallocation of the one or more previously assigned computing tasks to the first computing node is further based on the third voltage.

4. The computing component of claim 2, wherein the processing tasks are associated with sensor fusion.

5. The computing component of claim 2, wherein the processing tasks are associated with a simultaneous localization and mapping (SLAM) algorithm.

6. The computing component of claim 1, wherein the receiving of the initially processed data comprises receiving, from the second computing node, a response frame indicating that the initially processed data has been stored in a segment of a memory associated with the second computing node and retrieving the initially processed data from the segment of the memory.

7. The computing component of claim 1, wherein the I/O interfaces of the second computing node comprise first I/O interfaces that connect to one or more cameras, and the third computing node comprises second I/O interfaces that connect to one or more Lidars, wherein the second computing node is in closer proximity to the computing component.

8. A computing system implemented as part of a vehicle architecture, the computing system including:
   a computing component being connected to and coordinating computing nodes;
   the computing nodes, the computing nodes comprising instructions or logic that configure the computing nodes to perform computing functions, the computing nodes comprising:
   a first computing node that comprises a power distribution system;
   a second computing node that comprises input/output (I/O) interfaces to connect to devices, actuators, or sensors; and
   a third computing node; and wherein the computing component further comprises:
   one or more processors; and
   instructions or logic that, when executed by the one or more processors, cause the computing component to perform:
      transmitting commands to the second computing node, the commands associated with initial processing of data received at the second computing node from the devices, actuators, or sensors;
      receiving initially processed data from the second computing node;
      performing further processing on the initially processed data;
      offloading one or more previously assigned computing tasks from the second computing node or the third computing node based on respective health statuses and processing loads of the second computing node and the third computing node, wherein the second computing node or the third computing node that previously had performed the one or more previously assigned computing tasks; and
      allocating the offloaded one or more previously assigned computing tasks to the third computing node or the second computing node.

9. The computing system of claim 8, wherein the instructions or logic further cause the computing component to:
   receive, from the first computing node, an indication of a voltage transmitted to the second computing node and a second voltage transmitted to the third computing node, the voltage transmitted to the second computing node being indicative of an expected remaining lifespan of the second computing node and the second voltage transmitted to the third computing node being indicative of a second remaining lifespan of the third computing node; and
   offload the one or more previously assigned computing tasks from the second computing node or to the third computing node based on the voltage or the second voltage.

10. The computing system of claim 9, wherein the instructions or logic further cause the computing component to:
    receive, from the first computing node, an indication of a third voltage transmitted to the computing component; and
    wherein the reallocation of the one or more previously assigned computing tasks to the first computing node is further based on the third voltage.

11. The computing system of claim 9, wherein the processing tasks are associated with sensor fusion.

12. The computing system of claim 9, wherein the processing tasks are associated with a simultaneous localization and mapping (SLAM) algorithm.

13. The computing system of claim 8, wherein the computing component:
    determines, based on the further processed sensor data, a navigation action for the vehicle, and a change of an actuator corresponding to the navigation action;
    transmits, to the second computing node, a command to indicate the change of the actuator.

14. The computing system of claim 13, wherein the computing component:
    determines the navigation action based on a weather condition or a traffic condition.

15. The computing system of claim 8, wherein the first computing node:
    determines that the computing component is in a compromised status, wherein the computing component is unable to perform one or more functions based on a reduction in voltage being delivered to the computing component;
    transmits an indication of the compromised status to the second computing node or the third computing node; and
    offloads the one or more functions from the computing component to the second computing node or the third computing node.

16. The computing system of claim 8, wherein the power distribution system comprises a main power path comprising a main power supply and a backup power path comprising a backup power supply.

* * * * *